United States Patent
Ohsato et al.

(10) Patent No.: US 8,196,477 B2
(45) Date of Patent: Jun. 12, 2012

(54) FORCE SENSOR UNIT

(75) Inventors: Takeshi Ohsato, Wako (JP); Yasuhiko Jinbu, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 364 days.

(21) Appl. No.: 12/504,753

(22) Filed: Jul. 17, 2009

(65) Prior Publication Data

US 2010/0011885 A1    Jan. 21, 2010

(30) Foreign Application Priority Data

Jul. 18, 2008    (JP) .................................. 2008-187038

(51) Int. Cl.
*G01L 1/00* (2006.01)
(52) U.S. Cl. ....................................................... 73/766
(58) Field of Classification Search .................. 73/766, 73/862.621, 862.626, 862.044, 862.629, 73/862.391, 862.041–862.048, 862.381
See application file for complete search history.

(56) References Cited

U.S. PATENT DOCUMENTS

| 4,709,342 | A | 11/1987 | Hosoda et al. |
| 7,458,281 | B2* | 12/2008 | Ohsato et al. ............ 73/862.044 |
| 7,703,340 | B2* | 4/2010 | Sakurai et al. ........... 73/862.044 |
| 7,757,571 | B2* | 7/2010 | Hirabayashi et al. .... 73/862.626 |
| 2008/0066562 | A1 | 3/2008 | Sakurai et al. |

FOREIGN PATENT DOCUMENTS

| DE | 41 11 148 A1 | 10/1992 |
| EP | 1 739 401 A1 | 1/2007 |
| GB | 2 139 768 A | 11/1984 |
| JP | 2003-254843 | 9/2003 |
| JP | 2007-010379 | 1/2007 |

OTHER PUBLICATIONS

European Search Report 09165795.7-1236 / 2146194 dated Jan. 14, 2010.

* cited by examiner

*Primary Examiner* — Lisa Caputo
*Assistant Examiner* — Octavia D Davis-Hollington
(74) *Attorney, Agent, or Firm* — Squire Sanders (US) LLP (57) ABSTRACT

A force sensor unit includes: a detection section constituted of a main unit detecting external force and changes in temperature, and a sub unit detecting the changes in temperature, detecting the external force; and an attenuator dampening the external force and imparting the dampened force to the detection section.

16 Claims, 6 Drawing Sheets

FORCE SENSOR UNIT

BACKGROUND OF THE INVENTION

1. Field of the Invention

The present invention relates to a force sensor unit. In particular, this invention relates to a force sensor unit in which the effects of temperature changes are excluded when an external force is applied thereto so that the force sensor unit is able to accurately detect the external force.

Priority is claimed on Japanese Patent Application No. 2008-187038, filed Jul. 18, 2008, the contents of which are incorporated herein by reference.

2. Description of Related Art

Among conventional force sensors which detect external force, a force sensor is known which is provided with an attenuator which dampens external force which is applied thereto and then imparts the dampened force to a force sensor chip. This type of force sensor is disclosed in Japanese Unexamined Patent Application, First Publication No. 2003-254843.

This attenuator is provided with a dampening mechanism section which is used to dampen external force which is from an input section where external force is input to the force sensor chip via a transmitting section. Accordingly, external force is not transmitted directly to the force sensor chip.

For example, as disclosed in Japanese Unexamined Patent Application, First Publication No. 2007-010379, the dampening mechanism section of the attenuator is a disc-shaped portion which connects together a shaft-shaped input section and a circular cylinder-shaped sensor fixing section for the force sensor chip. A plurality of arc-shaped holes are provided in a toroidal shape this disc-shaped portion and input section, and by adjusting the size, shape, and number of this plurality of arc-shaped holes, it is possible to adjust the load resistance and adjust the sensitivity towards the respective axial forces, and thus ensure a degree of freedom when designing a force sensor.

In the above-described conventional force sensor, when an output signal from the force sensor is being amplified, a strain resistance element which forms the detection section of the force sensor performs the amplification while including therein signals which have been affected by changes in temperature. Because of this, the problem arises that any discrepancy from the true value is further amplified.

SUMMARY OF THE INVENTION

Therefore, it is an object of this invention to provide a force sensor unit which is minimally affected by changes in temperature and which makes it possible to improve the detection accuracy.

A first aspect of the invention provides a force sensor unit including: a detection section constituted of a main, unit detecting external force and changes in temperature, and a sub unit detecting the changes in temperature, detecting the external force; and an attenuator dampening the external force and imparting the dampened force to the detection section.

According to this structure, by excluding any discrepancy in external force detection values which is caused by changes in temperature detected by the main unit based on detection values from the sub unit which detects only changes in temperature, it is possible to obtain a differential output which is the amount of distortion caused only by the external force and from which the effects of changes in temperature have been excluded.

A second aspect of the invention provides a force sensor unit including: an attenuator and a detection section. In the force sensor unit of the second aspect of the invention, the attenuator includes: a first housing including an external force input section inputting external force, an external force transmission section transmitting the external force to the detection section, and a dampening mechanism section dampening the external force; and a second housing connected with an external structural body, and supporting the first housing. In the force sensor unit of the second aspect of the invention, the dampened force dampened by the attenuator is imparted to the detection section, and the detection section includes: a main unit detecting the external force and changes in temperature and having a lust end and a second end, the first end of the main unit being fixed to the second housing of the attenuator, and the second end of the main unit being connected with the external force transmission section of the attenuator; and a sub unit only detecting the changes in temperature, the sub unit being fixed to the first housing in a manner intercepting the connection with the external force transmission section.

According to this structure, it is possible to obtain a differential output by excluding any discrepancy in external force detection values which is caused by changes in temperature detected by the main unit in the second housing based on detection values from the sub unit which detects only changes in temperature due to the fact that it is in a state in which it is unaffected by external force applied to the first housing.

It is preferable that, in the force sensor unit of the first and second aspects of the invention, each of the main unit and the sub unit include a detection sensor chip. The detection sensor chip of the main unit is disposed so as to face the detection sensor chip of the sub unit.

According to this structure, because it is possible to narrow the distance between the detection sensor chip on the main unit side and the detection sensor chip on the sub unit side, the effects of changes in temperature can be received equally by both the main unit and the sub unit.

It is preferable that, in the force sensor unit of the first and second aspects of the invention, an axis on which the main unit is placed be the same as an axis on which the sub unit is placed.

According to this structure, because it is possible to narrow the distance between the detection sensor chip on the main unit side and the detection sensor chip on the sub unit side to the minimum possible distance, the effects of changes in temperature can be received equally by both the main unit and the sub unit.

It is preferable that, in the force sensor unit of the first and second aspects of the invention, the heat capacity of the main unit be equal to the heat capacity of the sub unit.

According to this structure, an equal heat distribution can be created in both the main unit and the sub unit, and it is possible to ensure a reliable differential output which is the amount of distortion caused only by the external force and from which the effects of changes in temperature have been excluded.

It is preferable that, in the force sensor unit of the first and second aspects of the invention, the coefficient of thermal conductivity of the main unit be equal to the coefficient of thermal conductivity of the sub unit.

According to this structure, the speed at which a quantity of heat received from a heat source arrives at the main unit and the sub unit is the same, and it is possible to shorten the length of time until variations in output values which are caused by changes in temperature are cancelled out.

It is preferable that, in the force sensor unit of the first and second aspects of the invention, the heat capacity of the main unit be equal to the heat capacity of the sub unit, and the coefficient of thermal conductivity of the main unit be equal to the coefficient of thermal conductivity of the sub unit.

According to this structure, an equal heat distribution can be created in both the main unit and the sub unit, and the speed at which a quantity of heat received from a heat source arrives at the main unit and the sub unit is the same, so that it is possible to shorten the length of tune until variations in output values which are caused by changes in temperature are cancelled out.

It is preferable that the force sensor unit of the first aspect of the invention further include: an external force input section; and a dampening mechanism section having a plurality of holes formed in a fan shape, the holes being arranged in a toroidal shape centered on the external force input section. It is preferable that, in the force sensor unit of the second aspect of the invention, the dampening mechanism section have a plurality of holes formed in a fan shape, and the holes be arranged in a toroidal shape centered on the external force input section.

According to this structure, the sensitivity balance of all shafts is ensured, and the absolute value of the output is made uniform.

Moreover, if the widths of the beams which are formed between the holes are made uniform, it is possible to prevent localized stress concentration, improve the load-bearing capacity, and make it more difficult for breakages to occur.

It is preferable that, in the force sensor unit of the first aspect of the invention, the attenuator include a dampening mechanism section composed of a diaphragm centered on a connection section between the main unit and the attenuator. It is preferable that, in the force sensor unit of the second aspect of the invention, the second housing include a dampening mechanism section composed of a diaphragm centered on a connection section between the main unit and the second housing.

According to this structure, it is possible to adjust the dampening performance against force in the axial direction of the external force input section.

According to the first aspect of the invention, by excluding any discrepancy in external force detection values which is caused by changes in temperature detected by the main unit based on detection values from the sub unit which detects only changes in temperature, it is possible to obtain a differential output which is the amount of distortion caused only by the external force and from which the effects of changes in temperature have been excluded. As a result of this, the effect is achieved that it is possible to accurately detect applied external force.

According to the second aspect of the invention, it is possible to obtain a differential output by excluding any discrepancy in external force detection values which is caused by changes in temperature detected by the main unit in the second housing based on detection values from the sub unit which detects only changes in temperature due to the fact that it is in a state in which it is unaffected by external force applied to the first housing. As a result of this, the effect is achieved that it is possible to accurately detect applied external force.

In the first and second aspects of the invention, because it is possible to narrow the distance between the detection sensor chip on the main unit side and the detection sensor chip on the sub unit side, the effects of changes in temperature can be received equally by both the main unit and the sub unit. As a result of this, the effect is achieved that it is possible to improve the reliability of a differential output.

In the first and second aspects of the invention, because it is possible to narrow the distance between the detection sensor chip on the main unit side and the detection sensor chip on the sub unit side to the minimum possible distance, the effects of changes in temperature can be received equally by both the main unit and the sub unit. As a result of this, the effect is achieved that it is possible to obtain a more reliable differential output.

In the first and second aspects of the invention, an equal heat distribution can be created in both the main unit and the sub unit, and it is possible to ensure a reliable differential output which is the amount of distortion caused only by the external force and from which the effects of changes in temperature have been excluded. As a result of this, the effect is obtained that external force can be accurately detected.

In the first and second aspects of the invention, the speed at which a quantity of heat received from a heat source arrives at the main unit and the sub unit is the same, and it is possible to shorten the length of tune until variations in output values which are caused by changes in temperature are cancelled out. As a result of this, the effect is obtained that external force can be rapidly detected.

In the first and second aspects of the invention, an equal heat distribution can be created in both the main unit and the sub unit, and the speed at which a quantity of heat received from a heat source arrives at the main unit and the sub unit is the same, so that it is possible to shorten the length of time until variations in output values which are caused by changes in temperature are cancelled out. As a result of this, the effects are obtained mat differential output can be more accurately obtained and that external force can be accurately detected.

In the first and second aspects of the invention, the sensitivity balance of all shafts is ensured, and the absolute value of the output is made uniform. As a result of this, the effect is obtained that it is possible to accurately detect external force irrespective of the direction of a shaft.

In the first and second aspects of the invention, it is possible to adjust the dampening performance against force in the axial direction of the external force input section. As a result of tins, the effect is obtained that it is possible to protect the main unit.

DETAILED DESCRIPTION OF THE INVENTION

Next, embodiments of this invention will be described based on the drawings.

Figure 1:
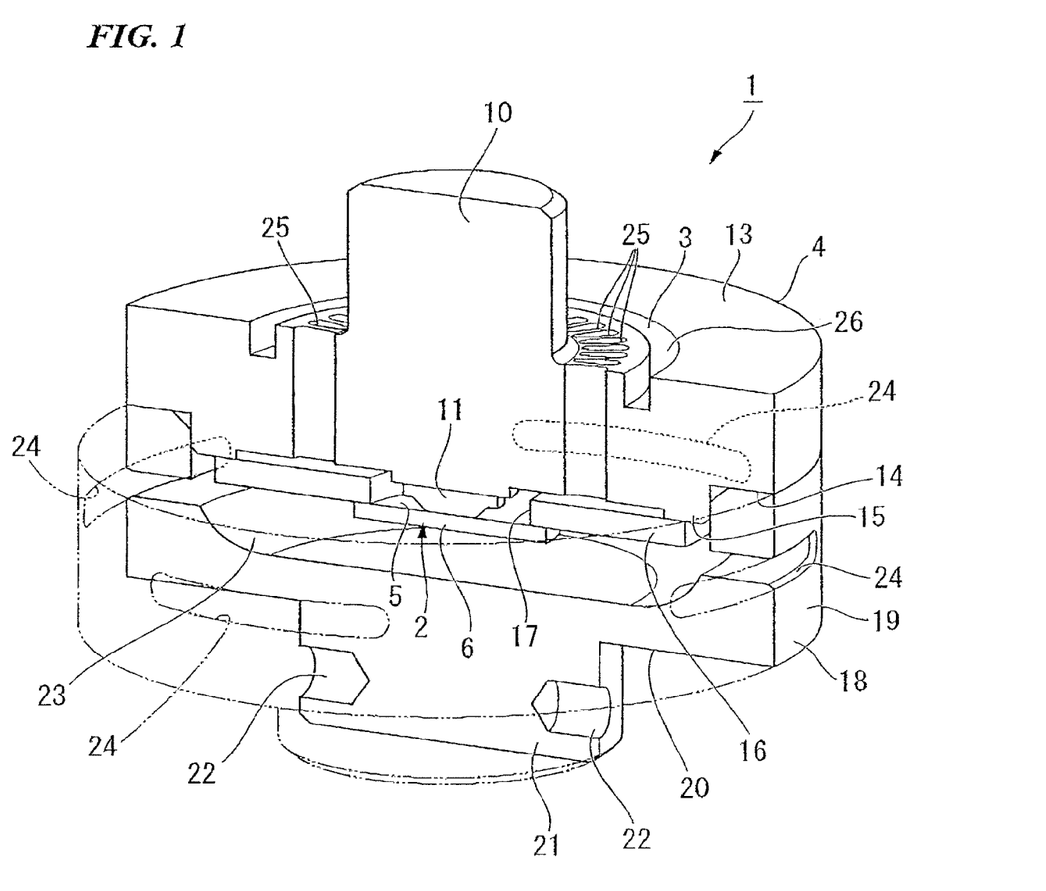
FIG. 1 is a perspective view showing principal portions of a force sensor of an embodiment of this invention.

FIG. 1 shows a force sensor 1 which is used in a force sensor unit U of an embodiment of this invention.

This force sensor 1 has a force sensor chip 2 which serves as a sensor chip for detecting external force, for example, force and moment, and with an attenuator 4 which is provided with a dampening mechanism section 3 which dampens this external force and then imparts it to the force sensor chip 2.

Figure 2:
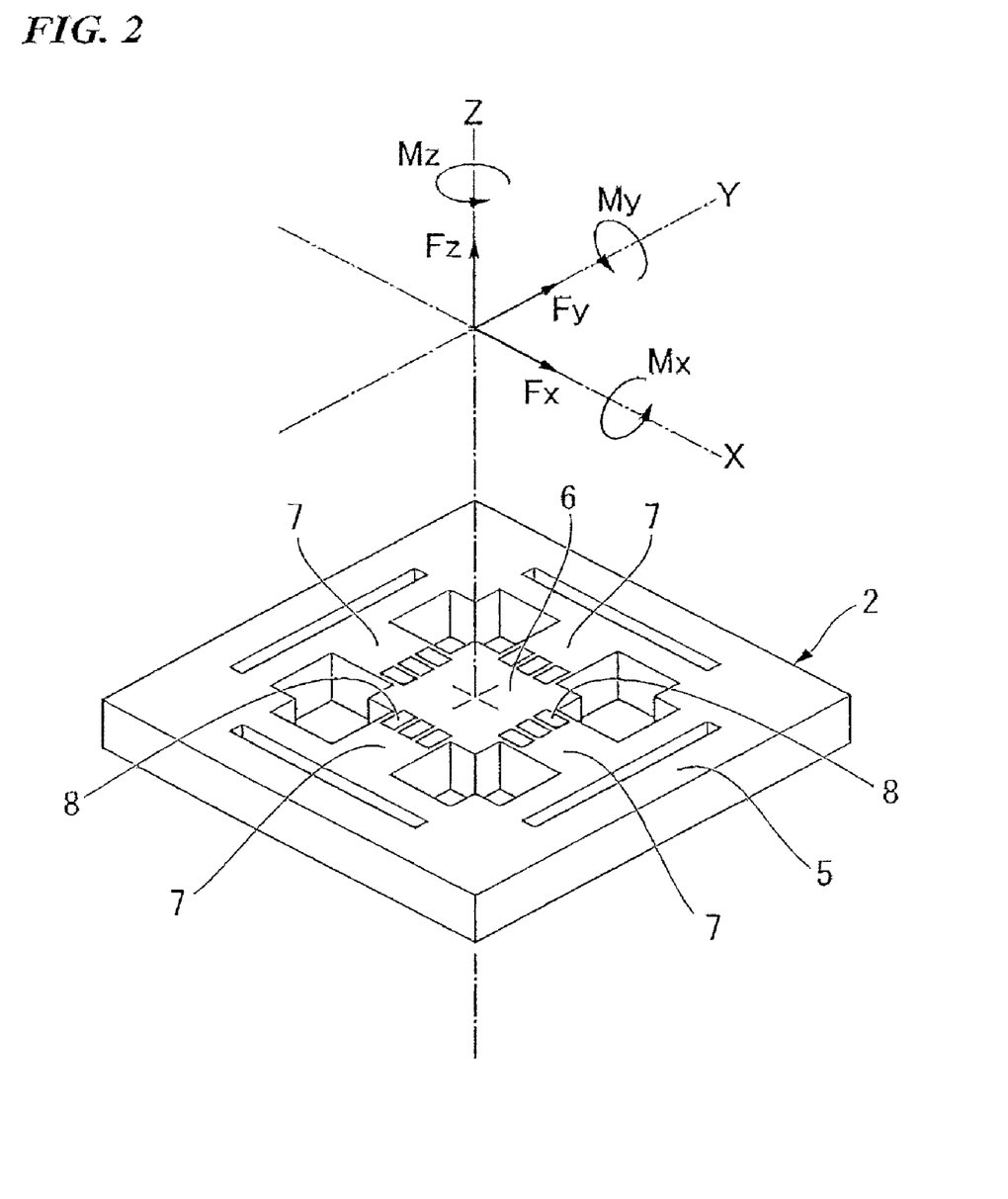
FIG. 2 is a perspective view showing the force sensor chip of an embodiment of this invention.

As shown in FIG. 2, tire force sensor chip 2 is formed in a square shape when seen in plan view and is manufactured using a semiconductor substrate so as to function as a 6-axis sensor.

The force sensor chip 2 is provided with a supporting section 5 shaped as a square frame which includes the respective sides, and with a square-shaped action section 6 which is formed in the center of the force sensor chip 2. Both ends of T-shaped connecting sections 7 are supported by the respective corner portions of the supporting section 5, and distal end portions of these four connecting sections 7 are joined to the respective sides of the action section 6. Three strain resistance elements 8 are provided on the surface of each boundary portion between the distal end portions of the four connecting sections 7 which support the action section 6 and the action section 6.

Here, the six axes refer to the force and moment for each one of three mutually orthogonal axes (i.e., the X axis, Y axis, and Z axis). The surface direction of the action section 6 is the Z axis, a direction parallel with the surface of the action section 6 is the X axis, and a direction orthogonal with the X axis is the Y axis. A force acting in the X axial direction is taken as Fx, a force acting in the Y axial direction is taken as Fy, and a force acting in the Z axial direction is taken as Fz. A moment acting in a direction around the X axis is taken as Mx, a moment acting in a direction around the Y axis is taken as My, and a moment acting in a direction around the Z axis is taken as Mz.

Namely, when the force sensor chip 2 receives any of these three forces Fx, Fy, and Fz and three moments Mx, My, and Mz, the action section 6 is displaced relatively to the supporting section 5, and the force sensor chip 2 detects the external force via an output from the strain resistance element 8 which receives the distortion resulting from this displacement.

As shown in FIG. 1, the attenuator 4 which imparts the external force to the force sensor chip 2 is provided with an input section 10 into which the external force is input.

This input section 10 is formed in a circular column shape, and the input section 10 is fixed in the circumferential direction, for example, by means of press-insertion or the like.

A circular column-shaped sensor fixing section 13 is formed around the input section 10.

The sensor fixing section 13 has the input section 10 protruding from a center portion of the front surface thereof, and a step section 14 which has been cut out towards the front surface side is formed in an outward side portion of a rear surface thereof.

A protruding ridge 15 is formed in a toroidal shape over the entire circumference of the inward side of the step section 14. An inward side of the protruding ridge 15 is formed as a planar surface, and a transmission section 11 which is formed from a glass material is provided in the center of a central portion thereof.

The dampening mechanism section 3, the input section 10, the transmission section 11, and the sensor fixing section 13 constitute the attenuator 4.

Here, the transmission section 11 is placed in contact with the action section 6 of the force sensor chip 2, and is positioned at the bottom end of the input potion 10. The transmission section 11 is formed in a tapered shape such that the cross-sectional area thereof becomes smaller approaching the distal end thereof.

A circumference of a supporting plate 16 which is formed from a glass material is fitted onto a top surface of the toroidal protruding ridge 15 which is facing downwards. An aperture section 17 is provided in a center portion of the supporting plate 16, and a circumferential edge of the aperture section 17 supports the supporting section 5 of the force sensor chip 2. In addition, the aperture section 17 receives the transmission section 11, and permits external force to be applied by the transmission section 11 to the force sensor chip 2.

A bottom fixing section 18 is fixed to the step section 14 of the sensor fixing section 13.

The bottom fixing section 18 engages with the step section 14 of the sensor fixing section 13, and is formed by a cylindrical side wall section 19 whose outer circumferential surface conforms to that of the sensor fixing section 13, a circular plate-shaped bottom wall section 20 which covers the force sensor chip 2 from the bottom side thereof, and a circular column-shaped fixing boss 21 which protrudes downwards from a center portion of a surface (i.e., a bottom surface) of the bottom wall section 20.

Holes 22 are formed in four locations on the outer circumference of the fixing boss 21.

Here, a recess section 23 that allows the attitude of the force sensor chip 2 to be changed is formed in a central portion of the rear surface (i.e., top surface) of the bottom wall section 20.

Moreover, four elongated holes 24 are formed in the side wall section 19 of the bottom fixing section 18.

Here, the dampening mechanism section 3 which dampens external force which is acting on the input section 10 is provided between the input section 10 and the sensor fixing section 13.

This dampening mechanism section 3 dampens external force so that the external force is applied in a dampened state from the transmission section 11 to the force sensor chip 2.

Specifically, the dampening mechanism section 3 is formed by a plurality of inner diameter side through holes 25 which are arranged in a toroidal shape centered on the input section 10 around the circumference of the input section 10 and extending from the front surface side of the sensor fixing section 13, and an outer diameter side toroidal groove 26 which is formed on the outer side of the plurality of through holes 25.

The through holes 25 are formed in a fan shape whose wider end faces outwards, and penetrate from the front surface side to the rear surface side of the sensor fixing section 13.

The through holes 25 open at a position on the inward side of the protruding ridge 15 of the sensor fixing section 13.

Moreover, the toroidal groove 26 is formed at a position on the inward side of the protruding ridge 15 in the radial direction, and is formed to a depth which reaches from the front surface side of the sensor fixing section 13 as far as the vicinity of the bottom portion of the step section 14.

Figure 3:
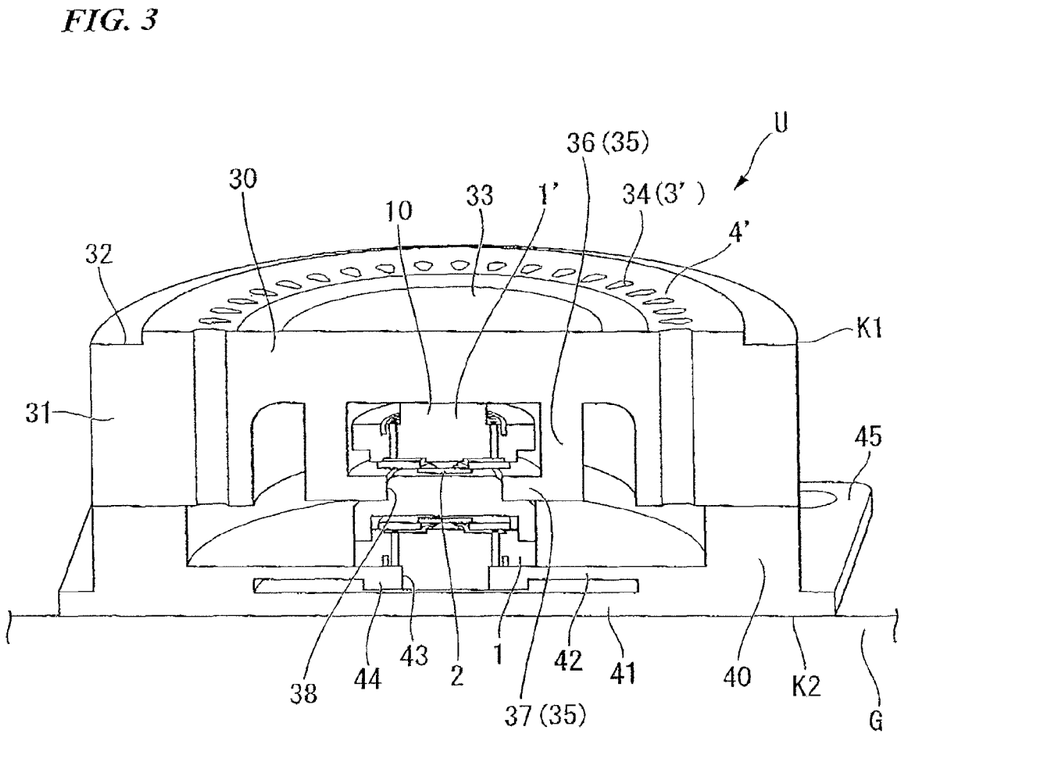
FIG. 3 is a perspective view showing a sensor unit of a first embodiment of this invention.
Figure 4:
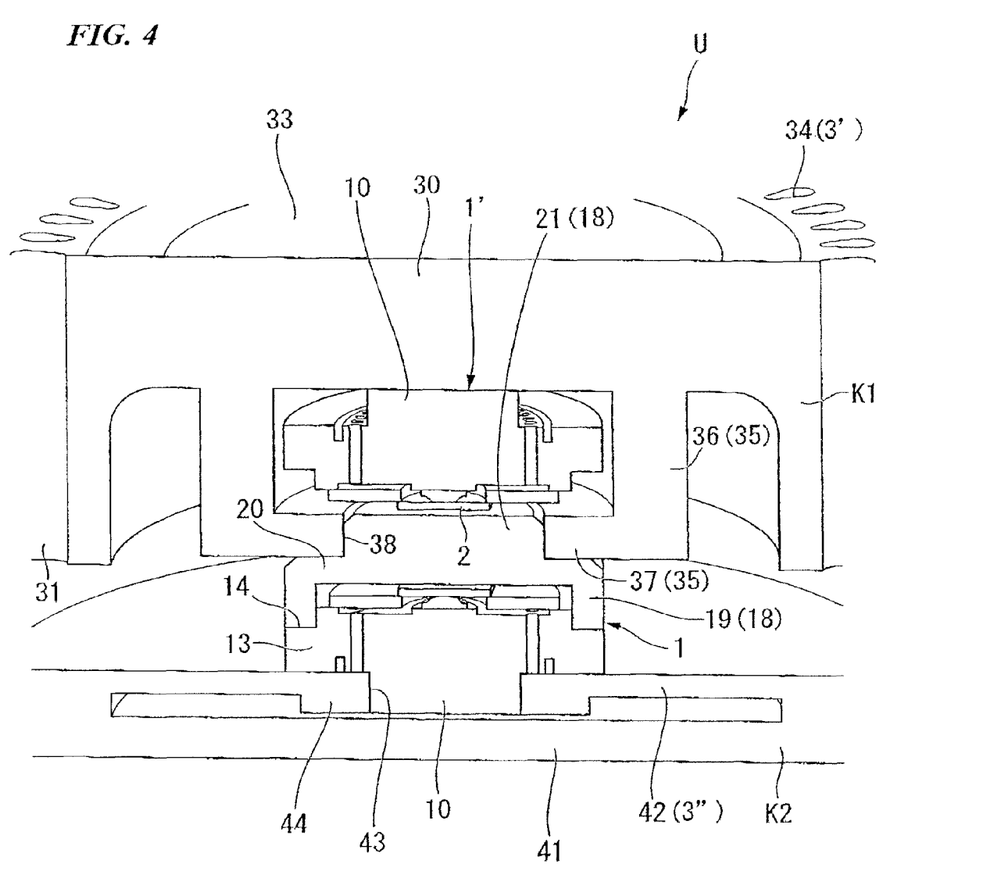
FIG. 4 is an enlarged perspective view partially showing of FIG. 3.

FIGS. 3 and 4 show a force sensor unit U of the first embodiment of this invention.

The force sensor unit U is provided with two force sensors 1 and 1' as external force detection sections.

An attenuator 4' is provided in the force sensor unit U, and external force is dampened by this attenuator 4' so that a dampened force is detected by the force sensor 1.

The attenuator 4' is provided with a first housing K1 and a second housing K2.

The first housing K1 is a flat, circular cylinder-shaped component, and has a substantially level top wall 30 and a circumferential wall 31.

A step section 32 is formed in a toroidal shape on a circumferential edge of the top wall 30, and a center portion of the top wall 30 is constructed as an external force input section 33 into which external force is input.

A plurality of fan-shaped through holes 34, 34 ... are arranged in a toroidal shape with the wider ends thereof facing outwards around the circumference of this external force input section 33 so as to penetrate from the front surface side to the rear surface side of the circumferential wall 31 and function as a dampening mechanism section 3'.

The external force input section 33 is constructed such that when an external force is acting on the external force input section 33, this external force can be transmitted to the force sensor 1 in a dampened state in the area of the plurality of toroidally arranged through holes 34.

A housing section 35 which houses a force sensor 1' for temperature compensation which is serving as the sub unit on an inner side portion of the circumferential wall 31 is formed in a center portion of the rear surface side of the top wall 30.

The housing section 35 is formed by a housing section circumferential wall 36 and a housing section bottom wall 37, and a mounting aperture section 38 is provided in the housing section bottom wall 37.

Here, a bottom surface of the housing section bottom wall 37 extends as far as tire vicinity of the bottom surface of the circumferential wall 31 of the first housing K1.

An external force transmission section is formed mainly by the housing section circumferential wall 36 and the housing section bottom wall 37.

Specifically, the force sensor 1' for temperature compensation which is housed in the housing section 35 is housed therein with the bottom fixing section 18 of the force sensor 1 which is serving as the main unit removed, and with the bottom side thereof facing the force sensor chip 2. In addition, the top surface of the input section 10 is fixed to the rear surface of the top wall 30 of the first housing K1 such that the periphery thereof is not in contact with the housing section bottom wall 37 and housing section circumferential wall 36 of the housing section 35.

Accordingly, the force sensor 1' for temperature compensation is supported inside the housing section 35 in a state of being suspended in air so that it does not receive any external force.

Namely, when a force acts on the external force input section 33 of the top wall 30, the input section 10 of the force sensor 1' for temperature compensation is also displaced so as to match the displacement of the top wall 30, however, because the bottom fixing section 18 has been removed, no force whatsoever is applied to the action section 6 of the force sensor chip 2 to which the supporting section 5 is not fixed. Accordingly, in the force sensor 1' for temperature compensation, output changes which are due to the fact that external force has been applied thereto are not generated in the strain resistance element 8, and only output changes which are caused by deformation of the strain resistance element 8 and correspond to temperature changes are detected.

The second housing K2 is fixed by bolts (not shown) to the circumferential wall 31 of the first housing K1.

The second housing K2 is a component which is formed by a circumferential wall 40 and a bottom wall 41. A top surface of the circumferential wall 40 is in contact with the bottom surface of the circumferential wall 31 of the first housing K1 and accordingly supports and fixes the first housing K1.

A thin, plate-shaped fixing bracket 42 (diaphragm) is provided in the second housing K2 extending above the bottom wall 41 and parallel with the bottom wall 41 towards the center portion from a joint portion between the circumferential wall 40 and the bottom wail 41.

Therefore, the attenuator 41' includes the dampening mechanism section 3' composed of the fixing bracket 42 which serves as a diaphragm. The fixing bracket 42 is centered on a connection section between the bottom fixing section 18 which serves as a main unit and the attenuator 4'.

In other words, the second housing K2 includes the dampening mechanism section 3' composed of the fixing bracket 42 which serves as a diaphragm. The fixing bracket 42 is centered on a connection section between the bottom fixing section 18 which serves as a main unit and the second housing K2.

This fixing bracket 42 is provided with a mounting aperture 43 in a center portion thereof, and a circumferential edge section 44 of the mounting aperture section 43 is formed with a greater thickness on its bottom side. The force sensor 1 for detecting external force is mounted in this mounting aperture 43.

This fixing bracket 42 has elasticity which enables it to function as a dampening mechanism section 3" which dampens force acting on the force sensor 1 which is used to detect external force.

A bracket 45 which is fixed to an external structural body G is formed on the bottom wall 41.

Specifically, tire force sensor 1 for detecting external force is inversely mounted such that the force sensor chip 2 faces upwards, and the input section 10 which is positioned on the bottom side is inserted from above into the mounting aperture 43 and is thereby fixed in position therein.

As a result, the force sensor chip 2 is placed as close as possible to and also facing the force sensor chip 2 of the force sensor 1' for temperature compensation.

Moreover, because the respective force sensors 1 and 1' are positioned in a center portion of the force sensor unit U, both of the force sensors 1 and 1' including the respective force sensor chips 2 are placed on the same axis (i.e., the Z axis).

At this time, it is also desirable for the external force input section 33 which is the input axis (i.e., center axis) of the attenuator 4' forming the external housing to be on the same axis as the input section 10 which is the input axis (i.e., center axis) of the respective force sensors 1 and 1'.

By employing this structure, it is possible to eliminate any bias when an external force is applied to the input section 10, and to uniformize the effects of heat from an external heat source.

The top surface of the sensor fixing section 13 of the force sensor 1 for detecting external force is in contact with a top surface of the circumferential edge section 44 of the fixing bracket 42.

Moreover, in the force sensor 1 for detecting external force, the bottom wall section 20 of the bottom fixing section 18 which is mounted on the step section 14 of the sensor fixing section 13 is in contact with the bottom surface of the housing section bottom wall 37 of the first housing K1 in which tire force sensor 1' for temperature compensation is housed, and the fixing boss 21 is inserted into a mounting aperture section 38 in the housing section bottom wall 37 of the first housing K1 so as to be fixed therein.

An edge face of the fixing boss 21 is formed on the same plane as the top surface of the housing section bottom wall 37 of the first housing K1, and an edge face of the fixing boss 21 is separated from the force sensor chip 2 of the force sensor 1' for temperature compensation housed in the housing section 35 of the first housing K1 and is thus not in contact therewith.

Here, because the force sensor 1' for temperature compensation and the force sensor 1 for detecting external force are the same type of component, they are farmed from materials having the same specific heat and the same thermal conductivity.

Specifically, excluding the supporting plate 16 and the transmission section 11 which are formed from a glass material, the other portions of the attenuator 4' are formed from a metal such as, for example, aluminum, iron, or stainless steel.

Moreover, these portions may also be formed from Fe—Ni based alloys such as invar or elinvar which are alloys having a low coefficient of thermal expansion, or from Fe—Ni—Co based alloys such as kovar, or magnesium alloys.

Moreover, although the same type of component has been used for the force sensor 1' for temperature compensation and the force sensor 1 for detecting external force, because the force sensor 1' for temperature compensation is used with the bottom fixing section 18 removed therefrom, the heat capacities of the two are different.

However, when both the force sensors 1 and 1' are mounted in the first housing K1 and the second housing K2, the fixing boss 21 of the bottom fixing section 18 of the force sensor 1 for detecting external force is positioned between the sensor fixing sections 13 and 13 which are placed facing each other.

Accordingly, apart from the fact that the force sensor 1 for detecting external force is provided with the bottom fixing section 18, because a layout structure is employed in which common sensor fixing sections 13 which both have an effect on the force sensor chip 2 as regards heat capacity are positioned facing each other, and between them is positioned the bottom fixing section 18 in the force sensor 1 for detecting external force, the factors determining the heat capacities of both the force sensors are equal.

Namely, when the layout of the respective force sensor chips 2 is looked at in the overall positional relationship, both the force sensors 1 and 1' are provided with the same heat capacity.

Accordingly, in FIG. 1, if, for example, the downwards force Fz in the Z axial direction is acting on the input section 10, a majority portion of this external force is transmitted from the periphery of the sensor fixing section 13 to the fixing boss 21 of the bottom fixing section 18 via the side wall section 19 of the bottom fixing section 18.

As a result, because external force acting on the input section 10 is dampened by the plurality of through holes 25 and the toroidal groove 26, and acts on the action section 6 of the force sensor chip 2 via the transmission section 11, and because the supporting section 5 of the force sensor chip 2 is supported by the supporting plate 16 which is supported on the sensor fixing section 13, dampened force can be applied to the force sensor chip 2.

Moreover, if the forces Fx and Fy in the X and Y axial directions act on the input section 10, then the input section 10 is displaced in the direction in which it collapses, however, because the majority portion of this external force is applied from the periphery of the sensor fixing section 13 to the bottom fixing section 18, in the same way, a dampened force is applied from the transmission section 11 to the action section 6 of the force sensor chip 2.

The external force which acts on the side wall section 19 of the bottom fixing section 18 is also dampened by the elongated holes 24.

Here, in the force sensor 1, because the plurality of inner diameter side through holes 25 which are arranged in a toroidal shape centered on the input section 10 around the circumference of the input section 10 and extending from the front surface side of the sensor fixing section 13, and the outer diameter side toroidal groove 26 which is formed on the outer side of the plurality of through holes 25 are provided as the dampening mechanism section 3, it is possible to reduce differences in detection sensitivity which are caused by discrepancy in characteristics which are dependent on the direction in which external force is applied (such as, for example, the possibility that bias will be generated in the size of the displacement of the transmission section 11 which is generated by external force depending on the direction in which that external force is applied) which are generated when only one of the through holes 25 and the toroidal groove 26 are provided.

Namely, there is no bias in characteristics caused by differences in the rotation direction for the moment Mz, and there is no bias in characteristics in the plurality of through holes 25 in both the compression direction and tensile direction for the force Fx, and in the toroidal groove 26, the bottom wall section of the toroidal groove 26 is able to apply force to the action section 6 of the force sensor chip 2 via the transmission section 11 without any bias for the two forces running in the Z axial direction.

Moreover, for the force Fx (the same is true for the force Fy), bias is generated in the force which is transmitted to the transmission section 11 both when the X axial direction matches the through hole formation positions for the plurality of inner side through holes 25 and when it is between adjacent through holes 25, however, because of the toroidal groove 26 which is provided on the outer side of the through holes 25, force in the X axial direction can be made to act on the force sensor chips 2 via the transmission section 11 without being dependent on the direction and without any bias.

Namely, by providing the through holes 25 and the toroidal groove 26 in a plurality of rows, the forces Fx and Fy can be dampened by a portion of the toroidal groove 26 on the outer side of the through holes 25 which has no bias in the characteristics thereof, and it is possible to reduce the overall bias irrespective of whether these forces Fx and Fy are in positions where they intersect the through holes 25.

Furthermore, for the moment Mx (the same is true for the moment My), in the plurality of through holes 25, unevenness is generated in the force depending on the location, however, the moment Mx can be made to act on the force sensor chips 2 via the transmission section 11 without any bias in the toroidal groove 26.

Accordingly, external force acting on the input section 10 can be applied from the transmission section 11 to tire force sensor chips 2 without any difference being generated in the detection sensitivity which is caused by directional bias, and the force sensor chips 2 can detect the force without unevenness.

As a result of this, when computation processing is performed on output data from the strain resistance element 8 to change it to a 6-axis force output, it is possible to markedly reduce calculation errors.

According to the above-described embodiment, when an external force is applied to the external force input section 33 of the first housing K1 of a force sensor unit U which has the above-described structure and incorporates both the force sensor 1 for detecting external force and the force sensor 1' for temperature compensation, the majority portion of the external force which is input into the external force input section 33 of the first housing K1 passes from the circumferential wall 31 of the first housing K1 via the circumferential wall 40 of the second housing K2 and is supported by the bracket 45 without any portion of this force being applied to the force sensor 1' for temperature compensation which is supported by the top wall 30 of the housing section 35.

As a result of this, no changes in output which are caused by the application of external force are detected from the force sensor 1' for temperature compensation, and only output changes which correspond to changes in temperature are detected.

Moreover, because the plurality of fan-shaped through holes 34, 34 . . . are arranged in a toroidal shape with the wider ends thereof facing outwards in the dampening mechanism 3', it is possible to ensure sensitivity balance towards external force and moment in the X axis, the Y axis, and the Z axis, and uniformize absolute values of outputs.

When the fan-shaped through holes 34, 34 . . . are being arranged in a toroidal shape, it is preferable for the width of the beam portions which are left intact to be made the same on the inner diameter side and the outer diameter side.

By employing this structure, when an external force is applied to the external force input section 33, because the widths of the beams are uniform, it is possible to prevent localized stress concentration, improve the load-bearing capacity, and make it more difficult for breakages to occur.

Here, because the force sensor 1 for detecting external force and the force sensor 1' for temperature compensation are placed facing each other on the Z axis, it is possible to reduce the distance between the two.

Accordingly, it is possible for the effects of changes in temperature to be received equally by the force sensor 1 for detecting external force and the force sensor 1' for temperature compensation, and differential outputs can be received more equally so that the reliability of differential outputs is improved.

In addition, because the force sensor 1 for detecting external force and the force sensor 15 for temperature compensation have the same heat capacity, it is possible to ensure the reliability of a differential output which is the amount of distortion caused solely by external force and from which the effects of changes in temperature have been removed, and to thus accurately detect an external force.

Moreover, because the force sensor 1 for detecting external force and the force sensor 1' for temperature compensation have the same coefficient of thermal conductivity, the speed at which a quantity of heat received from a heat source arrives at the force sensor 1 for detecting external force and the force sensor 1' for temperature compensation is the same, and it is possible to shorten the length of time until variations in output values which are caused by changes in temperature are cancelled out. Accordingly, rapid detection becomes possible.

Furthermore, as a result of the force sensor 1 for detecting external force and the force sensor 1' for temperature compensation having the same coefficient of thermal conductivity and, as described above, the same heat capacity as regards the force sensor chips 2, the force sensor 1 for detecting external force and the force sensor 1' for temperature compensation, can be provided with the same heat distribution so that an even more accurate differential output can be obtained.

In contrast, a portion of the external force which has been applied to the external force input section 33 and has been dampened is transmitted from the housing section circumferential wall 36 of the housing section 35 through the housing section bottom wall 37 to the fixing boss 21 of the bottom fixing section 18 of the force sensor 1 for detecting external force, and is then transmitted from this fixing boss 21 through the side wall section 19 of the bottom fixing section 18 and is applied to the sensor fixing section 13, thereby causing the supporting plate 16 which is supporting the supporting section 5 of the force sensor chip 2 to be displaced.

Moreover, a portion of the external force which has been applied to the sensor fixing section 13 is dampened by the plurality of through holes 25 and the toroidal groove 26 constituting the dampening mechanism section 3 and is then transmitted to the transmission section 11 which imparts the external force to the action section 6 of the force sensor chip 2.

Accordingly, as a result of the force sensor chip 2 imparting external force to the action section 6 by means of the transmission section 11 which is displaced relatively to the supporting section 5, the external force is detected in its dampened state by the force sensor chip 1.

Accordingly, by removing from the output value from the force sensor 1 for detecting external force the change portion in the detection value detected by the force sensor 1' for temperature compensation which is caused by changes in temperature, it is possible to detect a value for external force which does not depend on changes in temperature.

According to a simulation, when an external force of Fx=90N is being applied to the external force input section 33 of the force sensor unit U, if the temperature is raised from a room temperature of 20° C. to a temperature of 25° C. (i.e., room temperature +5° C.), then the output from the force sensor 1' for temperature compensation changes from the value shown in Table 1 to the value shown in Table 2, while the output from, the force sensor 1 for detecting external force changes from the value shown in Table 3 to the value shown in Table 4.

TABLE 1

(Output value from the force sensor 1' for temperature compensation when Fx = 90 N is applied at 20° C.)

|  |  | Fx | Fz | My | Mz |
|---|---|---|---|---|---|
| 20° C. | Fx = 90 N | 0.0 | 0.0 | 0.1 | 0.0 |
|  | Fz = 90 N | 0.1 | 2.8 | 0.0 | 0.0 |
|  | My = 90 N · cm | −0.5 | 0.0 | 0.0 | 0.0 |
|  | Mz = 90 N · cm | 0.0 | 0.0 | 0.0 | 0.0 |

TABLE 2

(Output value from the force sensor 1' for temperature compensation when Fx = 90 N is applied at 25° C.)

|  |  | Fx | Fz | My | Mz |
|---|---|---|---|---|---|
| 25° C. | Fx = 90 N | 0.0 | −16.9 | 0.1 | 0.0 |
|  | Fz = 90 N | 0.0 | −14.0 | 0.0 | 0.0 |
|  | My = 90 N · cm | 0.5 | −16.9 | 0.0 | 0.0 |
|  | Mz = 90 N · cm | 0.0 | −16.9 | 0.0 | 0.0 |

TABLE 3

(Output value from the force sensor 1 for detecting external force when Fx = 90 N is applied at 20° C.)

|  |  | Fx | Fz | My | Mz |
|---|---|---|---|---|---|
| 20° C. | Fx = 90 N | 92.6 | −4.1 | 50.7 | −0.4 |
|  | Fz = 90 N | 1.6 | −80.5 | −0.9 | −0.5 |
|  | My = 90 N · cm | −84.5 | −3.2 | −89.0 | −0.5 |
|  | Mz = 90 N · cm | −1.6 | −3.1 | 0.0 | 57.1 |

TABLE 4

(Output value from the force sensor 1 for detecting external force
when Fx = 90 N is applied at 25° C.)

|  |  | Fx | Fz | My | Mz |
|---|---|---|---|---|---|
| 25° C. | Fx = 90 N | 92.7 | −22.3 | 50.7 | −0.4 |
|  | Fz = 90 N | 1.7 | −98.7 | −0.9 | −0.5 |
|  | My = 90 N · cm | −84.3 | −21.4 | −88.9 | −0.7 |
|  | Mz = 90 N · cm | −1.6 | −21.3 | 0.0 | 57.1 |

As seen from these Tables, the amount of change in the output from the force sensor 1' for temperature compensation in which changes occur in detected values simply because the temperature has risen from room temperature and in which there are no effects from external force is included in the values from the force sensor 1 for detecting external force.

In this example, it is understood that, substantially, an effect is only generated on Fz.

Specifically, it is clear that, in the force sensor 1' for temperature compensation, approximately −17 μS of distortion is generated in Fz by a temperature rise of 5° C. In the same way as this, in the force sensor 1 for detecting external force, approximately −18 μS of distortion is generated by a temperature rise of 5° C.

Accordingly, if the output value obtained from the force sensor 1' for temperature compensation is subtracted from the value from the force sensor 1 for detecting external force, then it is possible when an external force has been applied to obtain a detection value for only the external force without there being any contamination from other factors.

Accordingly, it is possible to obtain a force sensor unit U which is able to accurately detect applied external force from detected values which have performed temperature compensation.

Furthermore, cases in which the temperature was changed from 0° C. to 60° C. will now described using Tables 5 through 9.

Tables 5 and 6 show output values from the force sensors 1 and 1' at temperatures of 0° C. and 60° C. and with no load being applied thereto.

If a state in which the temperature is 20° C., no load is being applied, and the output is 0 is taken as a reference, then it is understood from Tables 5 and 6 that when the temperature changes from 20° C., an Fz output is generated irrespective of the fact that there is no load.

Here, in a state in which an external force of Fz=−100N is applied to the external force input section 33 of the force sensor unit U, if the temperature is changed from a room temperature of 20° C. to a temperature of 0° C. (i.e., room temperature −20° C.), then the output from the force sensor 1 for detecting external force changes from the value shown in Table 7 to the value shown in Table 8 and the Fz output increases by 64.9 μS.

This is substantially the same as the drift output when the temperature is 0° C. and no load is being applied.

Moreover, in a state in which an external force of Fz=−100N is applied to the external force input section 33 of the force sensor unit U, if the temperature is changed from a room temperature of 20° C. to a temperature of 60° C. (i.e., room temperature +40° C.), then the output from the force sensor 1 for detecting external force changes from the value shown in Table 7 to the value shown in Table 9 and the Fz output decreases by 130 μS.

This is substantially the same as the drift output when the temperature is 60° C. and no load is being applied.

TABLE 5

(Output values from the force sensor 1 for detecting external force and the force sensor 1' for temperature compensation when no load is applied and the temperature is 0° C.)
0° C. NO LOAD

| Fx | Fz | My | Mz |
|---|---|---|---|
| 0.0 | 65.0 | 0.0 | 0.0 |

TABLE 6

(Output values from the force sensor 1 for detecting external force and the force sensor 1' for temperature compensation when no load is applied and the temperature is 60° C.)
60° C. NO LOAD

| Fx | Fz | My | Mz |
|---|---|---|---|
| 0.0 | −129.0 | 0.0 | 0.0 |

TABLE 7

(Output value from the force sensor 1 for detecting external force when external force is applied and the temperature is 20° C.)
20° C. REFERENCE

|  | Fx | Fz | My | Mz |
|---|---|---|---|---|
| Fx = 100 N | −87.3 | −3.1 | 61.2 | −0.5 |
| Fz = −100 N | 0.2 | −150.4 | 0.0 | −0.4 |
| My = 100 N · cm | −338.5 | −11.5 | 129.9 | −1.8 |
| Mz = 100 N · cm | 1.2 | −2.6 | 0.1 | 142.8 |

TABLE 8

(Output value from the force sensor 1 for detecting external force when external force is applied and the temperature is 0° C.)
0° C.

|  | Fx | Fz | My | Mz |
|---|---|---|---|---|
| Fx = 100 N | −87.3 | 61.7 | 61.5 | −0.4 |
| Fz = −100 N | 0.2 | −85.5 | 0.1 | −0.3 |
| My = 100 N · cm | −338.4 | 53.4 | 129.9 | −1.9 |
| Mz = 100 N · cm | 1.2 | 62.3 | 0.1 | 142.8 |

TABLE 9

(Output value from the force sensor 1 for detecting external force when external force is applied and the temperature is 60° C.)
60° C.

|  | Fx | Fz | My | Mz |
|---|---|---|---|---|
| Fx = 100 N | −87.3 | −133.0 | 61.3 | −0.5 |
| Fz = −100 N | 0.2 | −280.4 | 0.1 | −0.4 |
| My = 100 N · cm | −338.4 | −141.4 | 129.9 | −1.9 |
| Mz = 100 N · cm | 1.2 | −132.5 | 0.0 | 142.8 |

It is understood that, from these Tables, the amount of change in tire output from the force sensor 1' for temperature compensation in which changes occur in detected values simply because the temperature has risen (or dropped) from room temperature and in which there are no effects from external force is included in the values from the force sensor 1 for detecting external force.

In this example, it is understood that, substantially, an effect is only generated on Fz.

Specifically, it is clear that, in the force sensor 1' for temperature compensation, approximately 65 μS of distortion is generated in Fz by a temperature drop of 20° C. In the same way as this, in tire force sensor 1 for detecting external force, approximately 64.9 μS (−85.5−(−150.4)) of distortion is generated on top of this by a temperature drop of 20° C.

Accordingly, if the output value obtained from the force sensor 1' for temperature compensation is subtracted from the value from the force sensor 1 for detecting external force, then it is possible when an external force has been applied to obtain a detection value fox only the external force without there being any contamination from other factors.

Accordingly, it is possible to obtain a force sensor unit U which is able to accurately detect applied external force from detected values which have performed temperature compensation.

Figure 5:
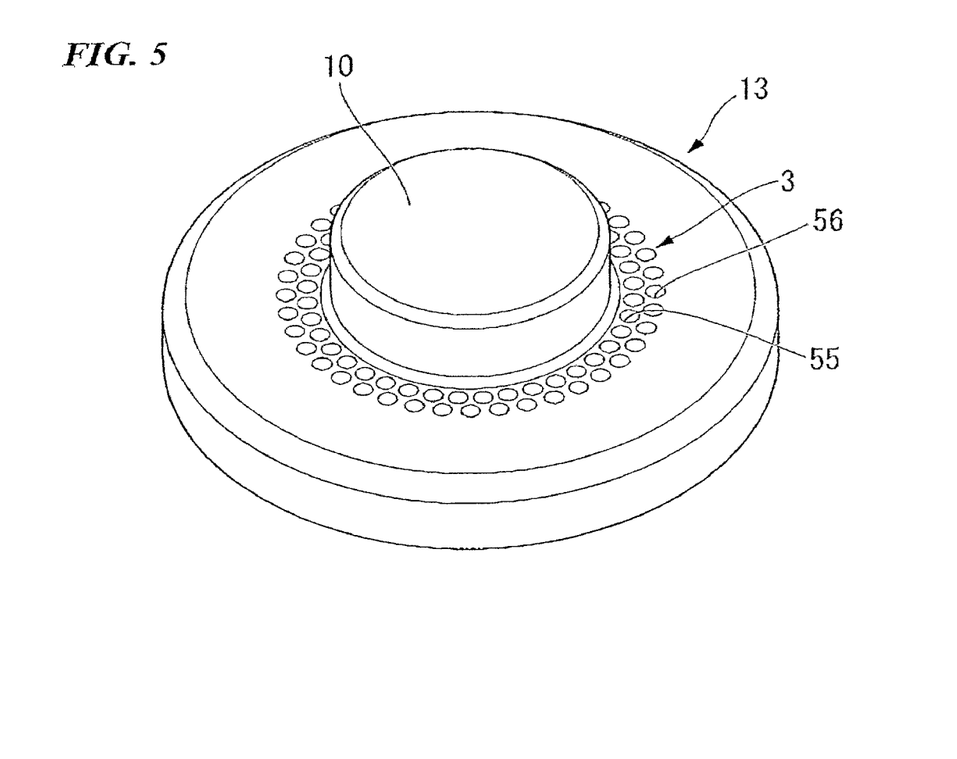
FIG. 5 is a perspective view showing a second embodiment of a force sensor.
Figure 6:
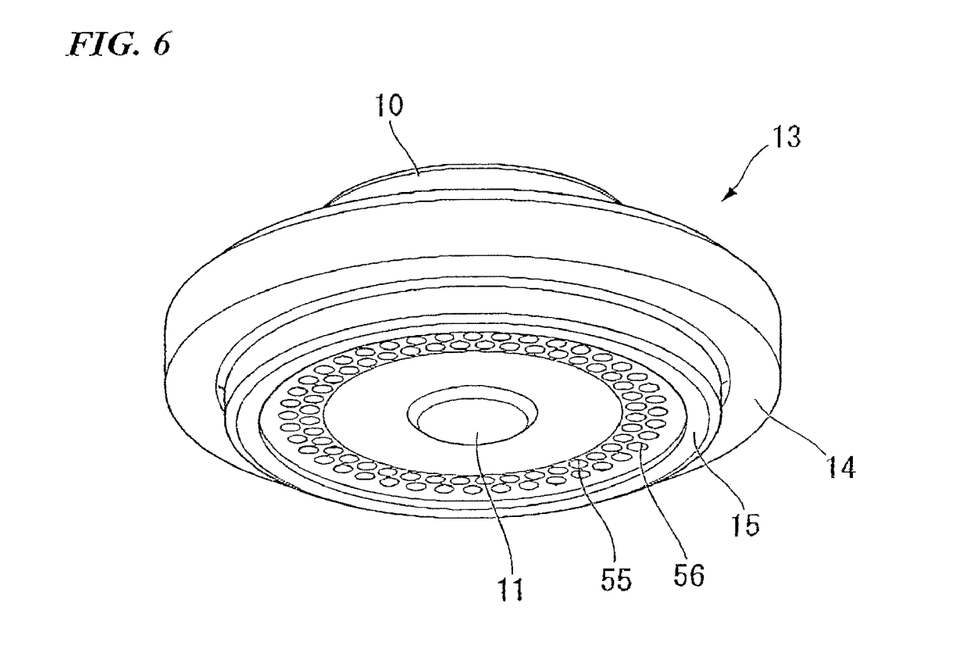
FIG. 6 is a perspective view of FIG. 5 as seen from underneath.

FIGS. 5 and 6 show a second embodiment of a force sensor unit.

In the first embodiment, a description is given of a case in which the plurality of through holes 25 and the toroidal groove 26 are provided in the sensor fixing section 13 as the dampening mechanism section 3, however, in this embodiment, as shown in FIGS. 5 and 6, a plurality of circular through holes 55 and 56 are provided in inner diametrical side and outer diametrical side toroidal rows. Each of the circular through holes 55 on the inner diametrical side is positioned between two circular through holes 56 on the outer diametrical side which are mutually adjacent in the circumferential direction.

Because the remainder of the structure and operation of this embodiment are the same as those of the first embodiment, the same reference numerals are used for the same portions and a description thereof is omitted.

Accordingly, force can be applied to the force sensor chip 2 via the transmission section 11 without there being any bias in characteristics caused by differences in the rotation direction for the moment Mz, and without there being any bias in characteristics in both the compression direction and tensile direction for the force Fz in both the circular through holes 55 and the circular through holes 56 which are provided in a plurality of rows.

Moreover, for the force Fx (the same is true for the force Fy), bias is generated in the force which is transmitted to the transmission section 11 both when the X axial direction matches the through hole formation positions of the plurality of circular through holes 55 on the inner diametrical side and when it is between adjacent circular through holes 55. However, when the X axial direction is located between circular through holes 55, because this corresponds to positions where the circular through holes 56 are formed on the outer diametrical side, any bias in the force on the inner diametrical side is dampened on the outer diametrical side so that force can be made to act without any bias on the force sensor chips 2 via the transmission section 11.

Furthermore, for the moment Mx (the same is true for the moment My), bias is generated in the force which is transmitted to the transmission section 11 both when the X axis matches the through hole formation positions of tire plurality of circular through holes 55 on the inner diametrical side and when it is between adjacent circular through holes 55, however, when the X axial direction is located between circular through holes 55 which are adjacent on the inner diametrical side, because this corresponds to positions where the circular through holes 56 are formed on the outer diametrical side, any bias in the moment on the inner diametrical side is dampened on the outer diametrical side so that moment can be made to act without any bias on the force sensor chips 2 via the transmission section 11.

Here, when positioning the circular through holes 55 and 56, by setting the sum of the cross-sectional lengths of the circular through holes 55 and the circular through, holes 56 so as to be the same irrespective of the direction in which they extend outwards from the axial center of the input section 10, it is possible to reliably eliminate any unevenness in the force Fx in the X axial direction (the same applies for the Y axial direction).

Moreover, by changing the diameters of both the circular through holes 55 and 56, or by changing the distance between the positions where the circular through holes 55 on the inner side are placed and the positions where the circular through holes 56 on the outer side are placed, it is possible to adjust the force which is transmitted to the force sensor chip 2.

Accordingly, in this embodiment as well, it is possible to reliably eliminate any differences in detection sensitivity which are caused by bias in the direction in which external force is applied to the input section 10, and to cause this force to be applied from the transmission section 11 to the force sensor chip 2, and be detected without any irregularities by the force sensor chip 2.

Figure 7:
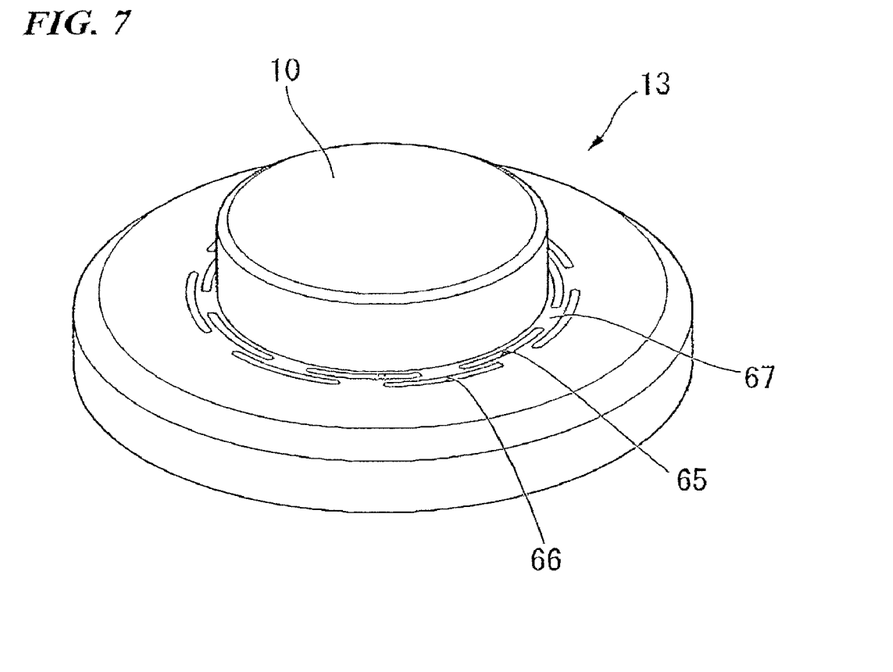
FIG. 7 is a perspective view showing a third embodiment of a force sensor.
Figure 8:
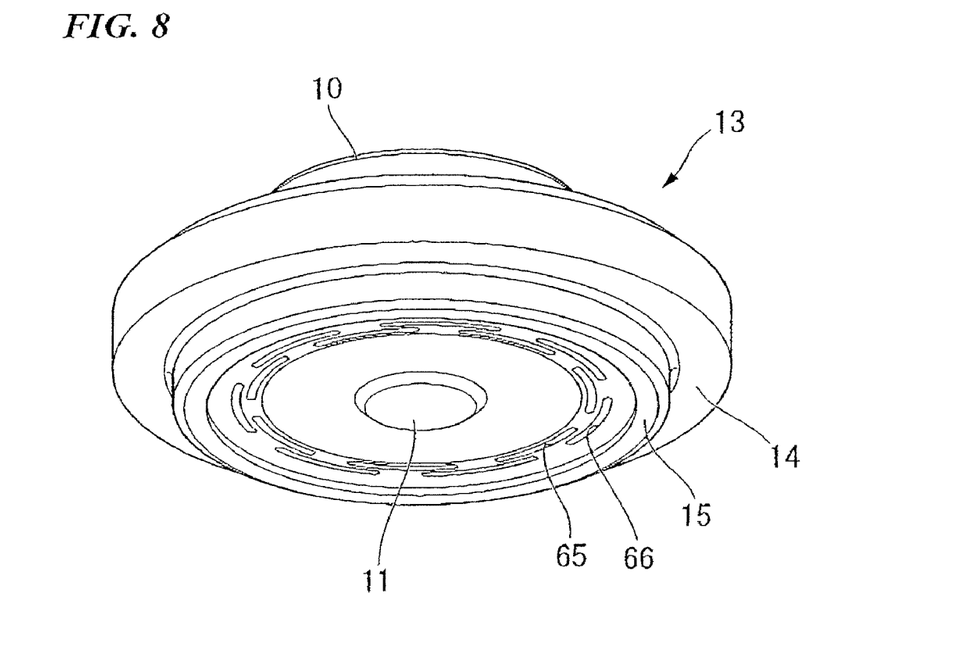
FIG. 8 is a perspective view of FIG. 7 as seen from underneath.

FIGS. 7 and 8 show a third embodiment of a force sensor.

Specifically, the above-described circular through holes 55 and 56 are replaced by inner diametrical side arc-shaped through holes 65 and outer diametrical side arc-shaped through holes 66, and these two are placed next to each other such that the inner diametrical side arc-shaped through holes 65 are positioned between end portions of adjacent outer diametrical side arc-shaped through holes 66 in the circumferential direction.

Because the remainder of the structure and operation of this embodiment are the same as those of the first embodiment, the same reference numerals are used for the same portions and a description thereof is omitted.

Accordingly, force can be applied to the force sensor chip 2 via the transmission section 11 without there being any bias in characteristics caused by differences in the rotation direction for the moment Mz, and without there being any bias in characteristics in both the compression direction and tensile direction for the force Fz in both the arc-shaped through holes 55 and the arc-shaped through holes 66 which are provided in a plurality of rows.

Moreover, for the force Fx (the same is true for the force Fy), bias is generated in the force which is transmitted to the transmission section 11 both when the X axial direction matches the through, hole formation positions of the plurality of arc-shaped through holes 65 on the inner diametrical side and when it is between end portions of adjacent arc-shaped through holes 65, however, when the X axial direction is located between end portions of the arc-shaped through holes 65, because this corresponds to positions where the arc-shaped through holes 66 are formed on the outer diametrical side, any bias in the force on the inner diametrical side is dampened on the outer diametrical side so that force can be made to act without any bias on the force sensor chips 2 via the transmission section 11.

Furthermore, for the moment Mx (the same is true for the moment My), bias is generated in the force which is transmitted to the transmission section 11 both when the X axis matches the through hole formation positions of the plurality of circular through holes 55 on the inner diametrical side and when it is between adjacent circular through holes 55, however, when the X axial direction is located between end portions of arc-shaped through holes 65 which are adjacent on the inner diametrical side, because this corresponds to positions where the arc-shaped through holes 66 are formed on the outer diametrical side, any bias in the moment on the inner diametrical side is dampened on the outer diametrical side so that moment can be made to act without any bias on the force sensor chips 2 via the transmission section 11.

In particular, because T-shaped portions 67 are formed in this embodiment by the portions between the inner side arc-shaped through holes 65 and the outer side arc-shaped through holes 66 and the portions between end portions of adjacent inner side arc-shaped through holes 65, any force can be dealt with flexibly and the dampening effect can be unproved.

Moreover, by changing the lengths of both the arc-shaped through holes 65 and the arc-shaped through holes 66, it is possible to adjust the force being transmitted to the force sensor chip 2.

Accordingly, in this embodiment as well, it is possible to reliably eliminate any differences in detection sensitivity which are caused by bias in the direction in which external force is applied to the input section 10, and to cause this force to be applied from the transmission section 11 to the force sensor chip 2, and be detected without any irregularities by the force sensor chip 2.

This invention is not limited to the above-described embodiments and, in addition to the fan-shaped through holes 34, it is also possible, for example, to provide a plurality of through holes in a toroidal configuration on the outer side thereof.

Moreover, provided that the force sensors 1 and 1' are provided with force sensor chips 2, then the structure is not limited to that described above.

What is claimed is:

1. A force sensor unit comprising:
a detection section comprising a main unit detecting external force and changes in temperature, and a sub unit detecting the changes in temperature, detecting the external force; and
an attenuator dampening the external force and imparting the dampened force to the detection section,
wherein each of the main unit and the sub unit includes a detection sensor chip.

2. The force sensor unit according to claim 1, wherein the detection sensor chip of the main unit is disposed so as to face the detection sensor chip of the sub unit.

3. The force sensor unit according to claim 1, wherein an axis on which the main unit is placed is the same as an axis on which the sub unit is placed.

4. The force sensor unit according to claim 1, wherein a coefficient of thermal conductivity of the main unit is equal to a coefficient of thermal conductivity of the sub unit.

5. The force sensor unit according to claim 1, further comprising:
an external force input section; and
a dampening mechanism section having a plurality of holes formed in a fan shape, the holes being arranged in a toroidal shape centered on the external force input section.

6. The force sensor unit according to claim 1, wherein the attenuator includes a dampening mechanism section composed of a diaphragm centered on a connection section between the main unit and the attenuator.

7. A force sensor unit comprising:
a detection section comprising a main unit detecting external force and changes in temperature, and a sub unit detecting the changes in temperature, detecting the external force; and
an attenuator dampening the external force and imparting the dampened force to the detection section, wherein
a heat capacity of the main unit is equal to a heat capacity of the sub unit.

8. A force sensor unit comprising:
a detection section comprising a main unit detecting external force and changes in temperature, and a sub unit detecting the changes in temperature, detecting the external force; and
an attenuator dampening the external force and imparting the dampened force to the detection section, wherein
a heat capacity of the main unit is equal to a heat capacity of the sub unit, and a coefficient of thermal conductivity of the main unit is equal to a coefficient of the thermal conductivity of the sub unit.

9. A force sensor unit comprising:
an attenuator comprising:
a first housing including an external force input section inputting external force, an external force transmission section transmitting the external force to a detection section, and a dampening mechanism section dampening the external force; and
a second housing connected with an external structural body, and supporting the first housing; and
a detection section to which the dampened force dampened by the attenuator is imparted, the detection section comprising:
a main unit detecting the external force and changes in temperature and having a first end and a second end, the first end of the main unit being fixed to the second housing of the attenuator, and the second end of the main unit being connected with the external force transmission section of the attenuator; and
a sub unit only detecting the changes in temperature, the sub unit being fixed to the first housing in a manner intercepting the connection with the external force transmission section.

10. The force sensor unit according to claim 9, wherein each of the main unit and the sub unit includes a detection sensor chip, and the detection sensor chip of the main unit is disposed so as to face the detection sensor chip of the sub unit.

11. The force sensor unit according to claim 9, wherein an axis on which the main unit is placed is the same as an axis on which the sub unit is placed.

12. The force sensor unit according to claim 9, wherein a heat capacity of the main unit is equal to a heat capacity of the sub unit.

13. The force sensor unit according to claim 9, wherein a coefficient of thermal conductivity of the main unit is equal to a coefficient of thermal conductivity of the sub unit.

14. The force sensor unit according to claim 9, wherein a heat capacity of the main unit is equal to a heat capacity of the sub unit, and a coefficient of thermal conductivity of the main unit is equal to a coefficient of thermal conductivity of the sub unit.

15. The force sensor unit according to claim 9, wherein the dampening mechanism section has a plurality of holes formed in a fan shape, and the holes are arranged in a toroidal shape centered on the external force input section.

16. The force sensor unit according to claim 9, wherein the second housing includes a dampening mechanism section composed of a diaphragm centered on a connection section between the main unit and the second housing.

* * * * *